(12) United States Patent
Chevalier et al.

(10) Patent No.: US 7,748,288 B2
(45) Date of Patent: Jul. 6, 2010

(54) GEAR-DRIVEN BALANCE SHAFT APPARATUS WITH BACKLASH CONTROL

(75) Inventors: Steven J. Chevalier, Britton, MI (US); David L. Killion, Clarkston, MI (US)

(73) Assignee: Metaldyne BSM, LLC, Plymouth, MI (US)

( * ) Notice: Subject to any disclaimer, the term of this patent is extended or adjusted under 35 U.S.C. 154(b) by 815 days.

(21) Appl. No.: 11/475,330

(22) Filed: Jun. 27, 2006

(65) Prior Publication Data

US 2007/0012130 A1 Jan. 18, 2007

Related U.S. Application Data

(60) Provisional application No. 60/694,352, filed on Jun. 27, 2005.

(51) Int. Cl.
*F16H 57/00* (2006.01)
*F16H 55/18* (2006.01)

(52) U.S. Cl. .......................................... 74/409; 74/406

(58) Field of Classification Search .................. 74/406, 74/409, 413; 474/110
See application file for complete search history.

(56) References Cited

U.S. PATENT DOCUMENTS

| | | | |
|---|---|---|---|
| 2,337,501 A | | 12/1943 | Schmidt |
| 2,397,777 A | * | 4/1946 | Colman ........................ 74/409 |
| 2,895,342 A | | 7/1959 | Hayhurst |
| 3,106,195 A | * | 10/1963 | Hanley .................... 123/90.15 |
| 3,331,256 A | | 7/1967 | Morris |
| 3,397,589 A | * | 8/1968 | Moore ......................... 74/397 |
| 3,460,405 A | | 8/1969 | Simmons |
| 3,610,065 A | | 10/1971 | Hayashi et al. |
| 3,889,549 A | | 6/1975 | Fieuzal et al. |
| 4,072,064 A | | 2/1978 | Lloyd et al. |
| 4,442,728 A | | 4/1984 | Jahnel |
| 5,542,311 A | | 8/1996 | Deeg |
| 5,685,197 A | | 11/1997 | Baker et al. |
| 5,967,940 A | | 10/1999 | Yamaguchi |
| 6,244,982 B1 | * | 6/2001 | Merelli ........................ 474/138 |
| 6,301,986 B1 | | 10/2001 | Berky |
| 6,626,139 B1 | | 9/2003 | Horita et al. |

(Continued)

FOREIGN PATENT DOCUMENTS

DE      1944599 U      5/1966

(Continued)

OTHER PUBLICATIONS

Int'l Search Report, Dec. 18, 2006, Metaldyne Company LLC.

(Continued)

*Primary Examiner*—Thomas R Hannon
*Assistant Examiner*—Justin Krause
(74) *Attorney, Agent, or Firm*—Cantor Colburn LLP

(57) ABSTRACT

An apparatus for controlling backlash comprising an intermediate gear capable of adjustably meshed engagement between a first driving gear and a second driven gear, and a body rotatably supporting the intermediate gear and capable of movement in a direction that reduces the center distance between the intermediate gear and either the first gear, the second gear, or both. The movement of the body utilizes both resilient urging and hysteretic damping to supply appropriately light resilient biasing while being fortified against rapid retraction or repulsion.

27 Claims, 13 Drawing Sheets

U.S. PATENT DOCUMENTS 6,729,986 B2 * 5/2004 Kurohata et al. ............ 474/110
2004/0200302 A1 10/2004 Kampichler et al.

FOREIGN PATENT DOCUMENTS

| DE | 2406076 | 10/1974 |
|---|---|---|
| DE | 60009120 T2 | 2/2005 |
| JP | 2002295591 A * | 10/2002 |
| JP | 2003120796 A * | 4/2003 |

OTHER PUBLICATIONS

Written Opinion, Dec. 18, 2006, Metaldyne Company LLC.
German Application No. 11 2006 001 731, Office Action Mailed Jun. 1, 2009 Including Search Report, 5 pages.
German Application No. 11 2006 001 731, Translation of Office Action Mailed Jun. 1, 2009 Including Search Report, 5 pages.
Best Available Translation of Description From German Patent DE1944599.

* cited by examiner

GEAR-DRIVEN BALANCE SHAFT APPARATUS WITH BACKLASH CONTROL

CROSS-REFERENCE TO RELATED APPLICATIONS

This application claims priority from U.S. Provisional Patent Application No. 60/694,352 filed on Jun. 27, 2005, which is hereby incorporated by reference.

BACKGROUND

Balance shafts which are utilized to offset the cyclic shaking forces of rotating and reciprocating engine masses are required to maintain substantially fixed angular timing relationships with the engine's crankshaft. Chain drives and gearsets are both capable of this functionality, but both introduce acoustic emission issues when trying to do the job alone. Toothed belt drives are feasible but are generally unsuited to application requirements.

"Chain Alone" Challenges—Chain drive systems having the automatic tensioning devices customarily needed to accommodate a lifetime of component wear can quite comfortably manage the operating center distance (hereafter "center distance") variations that challenge gearsets, but carry acoustic emission issues of their own. Inherent to any chain drive system is the polygonal motion or so-called chordal action of the segmented chain's engagement with its sprockets, which is exaggerated in the case of smaller, lower toothcount sprockets. Meshing excitations become more severe with the square of increases in chain velocity, as the radial displacements and tangential velocity variations of chordal action become compressed into ever-tighter timeframes. A single-stage 2:1 step-up ratio balance shaft chain drive system, with its 2:1 difference in sprocket sizes, is acoustically challenged by the high chordal action of its relatively "undersized" driven sprocket being combined with the high chain velocities associated with its much larger driver (crankshaft) sprocket. The chain meshing forces excite engine structures, often resulting in audible emissions.

"Gearset Alone" Challenges—In the case of direct drive gearsets connecting a balance shaft apparatus with a crankshaft-mounted drive gear, the principal engineering challenge is the management of the substantial variations in center distance imposed on the gears by differential thermal expansion effects, tolerance stack-ups, and crankshaft mobility. The result of center distance variation between gears is variation in the backlash, or operating clearance, between mating teeth.

Insufficient backlash (forced tight mesh) results in greatly increased meshing noise (or "whine"), and risk of tooth fatigue due to the large cantilever bending loads imposed by the wedging together of the teeth in mesh. Excessive backlash magnitudes allow sufficient tooth separation magnitude, under the crankshaft's ubiquitous torsional accelerations, as to result in tooth closure impact energy that is large enough to overcome oil film cushioning effects, with the unpleasant result being acoustic emissions (or "rattle").

Oil film cushioning effects are maximized with gear geometry and operating alignment controls that ensure high values of effective total contact ratio (the actual average number of teeth in contact, hereafter "contact ratio"). With current low viscosity oils and elevated operating temperatures, however, the tooth closure energy associated with excessive backlash can overwhelm the energy absorption capabilities of optimized oil film cushioning effects. The center distance variations associated with contemporary engine thermal effects alone are so large as to incur backlash variations which compromise the acoustic performance of conventional direct drive gearsets under very ordinary thermal operating ranges.

Scissors gears and so-called Vernier gears have been utilized for anti-lash drive systems in cases of relatively low mesh velocity where packaging space and cost constraints permit, but the crankshafts of contemporary high speed gasoline engines are not among these cases. The drawbacks of scissors gears are known to include meshing noise, durability, and very high manufacturing cost. Meshing noise arises from the high tooth loadings which accompany the resilient biasing between side-by-side paired (or "split") gear members, and is exacerbated by the compromises in contact ratio that result from the packaging space sharing that is required of these side-by-side gear members. Durability challenges are posed by the abnormally high tangential tooth loading required to directly convey the inertia torques of torsional vibrations imposed on the gearsets, in conjunction with the packaging space-dictated narrowness of gear members. Substantial manufacturing costs arise from the extreme precision required for location and runout control of the biasing gear member with respect to the fixed member, and the high material property demands placed by the high tangential tooth loads.

Accordingly, need exists for practical and cost effective inventive methods and structures for the control of the backlash of crankshaft to balance shaft apparatus gearsets over a wide range of operating temperatures, without invoking the noise, durability, and manufacturing cost compromises associated with the complexity, tooth loading, and packaging space sharing that scissors and vernier gear drives comprise.

SUMMARY OF THE INVENTION

Therefore, disclosed herein, is the employment of at least one motion control device which utilizes both resilient urging and hysteretic (or viscous) damping, preferably in conjunction with the capture of hydraulic fluid pressure as provided by a host engine's lubricating system, to supply appropriately light resilient biasing of an intermediate gear, towards a crankshaft gear, and preferably also a mating gear, the resilient biasing being fortified against rapid retraction or repulsion of the intermediate gear away from the crankshaft gear by the hysteretic or viscous damping and/or fluid capture.

BRIEF DESCRIPTION OF THE SEVERAL VIEWS OF THE DRAWING

The invention may take physical form in certain parts and arrangements of parts with several embodiments being described in detail in this specification and illustrated in the accompanying drawings wherein.

DETAILED DESCRIPTION

Figure 1:
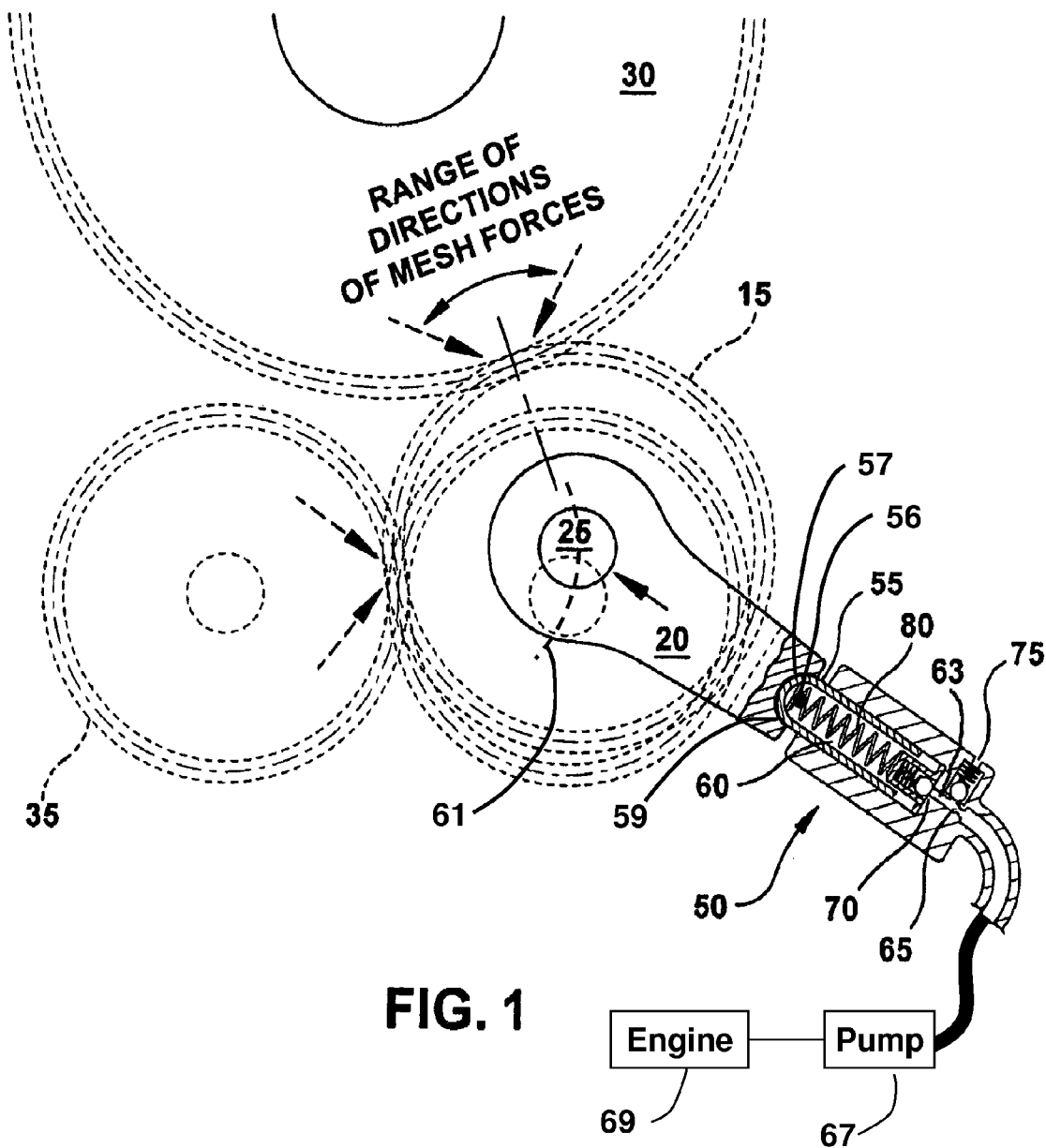
FIG. 1 is a first embodiment of an apparatus for controlling backlash.

Referring now to the drawings, which show several embodiments of the invention only for the purpose of illustration and not for purposes of limiting the same, an apparatus for controlling backlash generally comprises an intermediate gear capable of adjustably meshed engagement between a first driving gear and preferably also a second driven gear, and a body rotatably supporting the intermediate gear wherein the body is capable of movement supporting the intermediate gear's adjustably meshed engagement with the first gear and preferably also the second gear.

While the present invention can be utilized to minimize noise in numerous gearing relationships, the preferred embodiment utilizes the invention with balance shafts used in automotive applications. A common problem associated with balance shafts is a noise known as "gear rattle" generally occurring at engine idle. Gear rattle occurs when the teeth of the balance shaft timing gears lose contact then re-establish contact with impact. Such contact loss is caused by a fluctuation in crankshaft speed between the firing pulses of succeeding cylinders. Clearly, elimination of this gear rattle noise is desired.

As known in the art, pairs of balance shafts can be carried in a housing below the crankshaft and oppositely rotated at twice crankshaft speed to generate a vertical shaking force offsetting the shaking forces inherent to the engine. One of the pair of balance shafts is usually driven by a gear or chain from the engine crankshaft while the other balance shaft is typically connected for counter-rotation by a pair of timing gears. A single balance shaft driven by the crankshaft is also known. It should be clear that the invention can be used successfully for any application where reduction in gear noise is sought.

Figure 8:
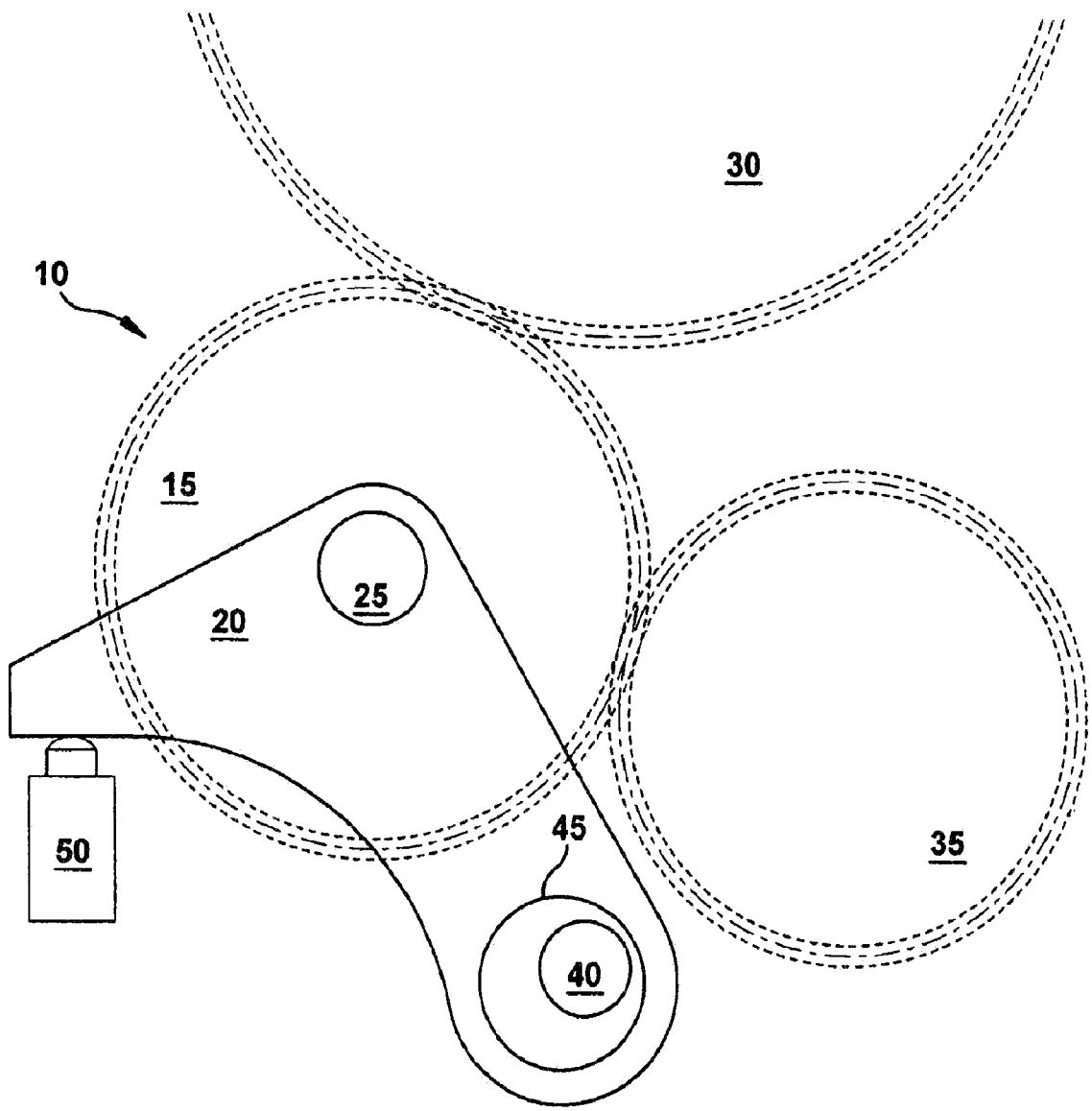
FIG. 8 is an eighth embodiment of an apparatus for controlling backlash, which is presently the preferred embodiment.

With reference to FIG. 8, the presently preferred embodiment of the invention, the apparatus for controlling backlash is described as follows. For simplicity, throughout the drawings like elements will be referred to by like element numbers. The apparatus 10 generally comprises an idler or intermediate gear 15 rotatably supported by a body 20 about an axle 25. The intermediate gear 15 is of any size and includes gear teeth to maintain the appropriate gear ratio between the crankshaft gear 30 and the mating gear 35. Likewise, the crankshaft gear 30 and the mating gear 35 can be of any size and include gear teeth of any configuration as preferred. As such, the intermediate gear is urged into engagement with both the crankshaft gear 30 and the mating gear 35 to provide the proper backlash adjustment.

As shown in FIG. 8, the body 20 is pivotable about eccentric link 45 which in turn is pivotable about fixed axle 40. The two links (link 25,45 and 45,40) have center distances preferably at angles to one another in order to provide two-degrees-of-freedom mobility to intermediate gear 15 as it rotates about its axle 25. Intermediate gear 15 is thus free to seek minimum backlash proximity to both crankshaft gear 30 and mating gear 35 by minimizing center distances to each independently. Also, for more compact package size, the pivot structure for body 20 may be reversed wherein axle 25 is replaced with an eccentric link and eccentric link 45 is replaced with just a fixed axle.

A motion control device 50 preferably utilizes the functionality of a so-called "lash adjuster" as is known, e.g. for maintenance of consistent operating clearance in internal combustion engine valvetrains, and is herein utilized to maintain close proximity between the teeth of the mating gears while manifesting substantial rigidity against rapidly applied cyclic or intermittent loading that acts to separate the mating gear members. The motion control device 50 thus preferably acts like a self-relaxing hydraulic ratchet to strongly resist transient compressive loading without strongly urging the mating gears together.

Such a motion control device 50, hereafter referred to as a "lash adjuster" and shown in FIG. 1, preferably comprises a sealingly moveable pressure transfer member or piston 55 which varies by its motion the captured volume of a hydraulic fluid or oil in a substantially rigid capturing space 60. Oil is introduced under pressure from a fluid supply or pump system 67 into the capturing space 60 by at least one orifice 63 that preferably comprises at least one one-way valve or check valve 70 to resist egress of the oil from the capturing space 60. FIG. 1 shows a simple unitized configuration, but it is to be understood that more conventional configurations having axially mobile cylindrical bodies sealingly captured in adjacent housing structures can be utilizes.

The oil pressure that acts to move fluid into the capturing space 60 past the check valve 70 is preferably controlled to being a lower, substantially more consistent value (e.g. with lower variation with engine speed and oil temperature) than that of the pump system 67, by the inventive series combination, upstream of the lash adjuster check valve 70 of the lash adjuster, of a restriction or metering orifice 65, upstream of a normally non-passing pressure control valve or bypass valve 75. Such an upstream pressure regulation device, an example of which is shown in FIG. 1, is preferably designed to assure that the operating pressure of the oil supply which fills and replenishes the capturing space of the lash adjuster, remains substantially constant under all operating conditions so as not to induce forced tight mesh and consequent meshing noise at cold and/or high speed operating conditions when the engine oil system 67 pressure tends to be high, as regulated by the engine's 69 oil pump's bypass valve. As such, the upstream metering orifice and bypass valve must re-regulate lash adjuster feed pressure from that of the engine oil system 67, to near that of the engine 69 system's minimum operating pressure, which occurs at idle speed, when pump output flow is at minimum, and under high operating temperature conditions, when oil viscosity is also near its minimum. The physical proportions of such a lash adjuster bypass valve are atypical: with hot idle system pressures on the order of 250 kPa, a combination of unusually light spring pressure with unusually large valve area is needed to allow relief pressures of this magnitude.

The piston 55 of the lash adjuster 50 is preferably also resiliently biased by a biasing member or spring 80 such that lash adjustment functionality remains during times when the engine 69 is stopped and oil pressure from said pump system 67 is lacking. The piston 55 (or alternatively the body of an axially mobile lash adjuster) is in supportively mobile communication with the intermediate gear 15 such that its resilient and pressure transfer urging act to substantially eliminate backlash between the intermediate gear 15 and the crankshaft gear 30 and preferably also the mating gear 35 without strongly urging the gears together (towards reduced center distance), and with substantial rigidity of support against rapid separation of the gears (towards increased center distance) and increased backlash. The aforementioned hysteretic damping consists, in the preferred case of an oil-capture type lash adjuster device, of the viscous resistance to leakage out of the capture space 60, which leakage may be limited to that permitted past the piston-bore clearance and the check valve, or may be augmented by a flow-resisting restriction passage or orifice for more rapid response to crankshaft mobility, etc.

With the lash adjuster's spring 80 preferably being, by design, itself capable of maintaining backlash-free meshing of the intermediate gear 15 and the crankshaft gear 30, the lash adjuster's hydraulic biasing is preferably minimized so as not to further contribute to meshing noise. This hydraulic bias minimization is dependent in part upon piston area, and in part upon the aforementioned constancy of re-regulated lash adjuster feed pressure.

At least six basic categories of kinematic structures are defined in conjunction with the employment of at least one lash adjuster 50 for minimizing backlash without introduction of excessive radial loading between gears (forced tight mesh): the first two may be grouped into the classification of two-degrees-of-freedom motion control, while the remaining four may be grouped into the classification of single degree-of-freedom motion control.

Apparatuses of the two-degrees-of-freedom class allow both meshes, e.g. that of intermediate gear 15 with crankshaft gear 30 and that of intermediate gear 15 with the mating gear 35 of the balance shaft, to establish minimal backlash simultaneously while the single degree-of-freedom class allows only one mesh to establish minimal backlash, the other being held either as nearly constant as possible, or alternatively, being tightened proportionally as a consequence of motion principally directed towards adjustment of the crankshaft gear mesh. Given the substantially greater backlash control challenge posed by the crankshaft gear mesh, it will be hereafter assumed that the real-time adjustability provided by the single degree-of-freedom class will be applied at the crankshaft gear mesh zone, with the mating gear mesh zone being at most adjusted dependently. The shorter center distance and the reduced mobility associated with the mating gear allow it to pose less of a physics dilemma than has been outlined above for the crankshaft gear mesh.

Category 1

Floating Center Intermediate Gear

FIG. 1 illustrates the simplest architecture two-degree-of-freedom apparatus which locates the intermediate gear 15 through body 20 and lash adjuster 50. The lash adjuster 50 acts to urge the intermediate gear 15 into meshing contact with both the driving crankshaft gear 30 and the mating gear 35 by effecting resultant force in a direction between the meshes. This category of motion control apparatus enables the intermediate gear 15 to attain best fit operating proximity with both of its mating gears by providing the intermediate gear's rotational centerline with two degrees of freedom, i.e. the ability to migrate in any direction within a single plane, such as along accurate path 61 for example. Axis alignment of gear tooth geometries with respect to each other is critical to gear drive functionality, so further degrees-of-freedom are inhibited by appropriate structural configuration choices.

Figure 2:
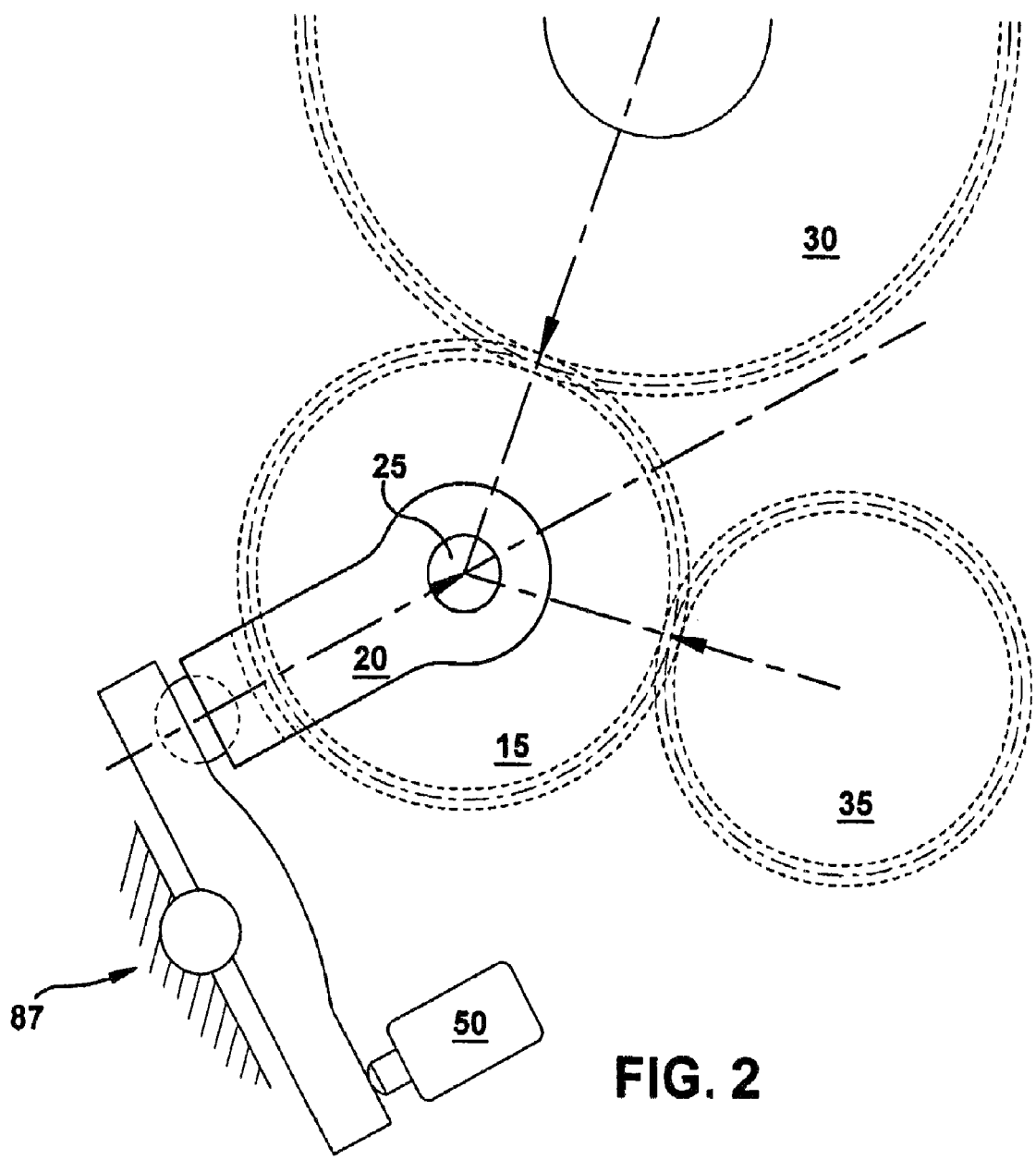
FIG. 2 is second embodiment of an apparatus for controlling backlash.

The required intermediate gear axis alignment control with respect to its two mating gears may be assured by numerous structural arrangements, the simplest of which is either capture of parallel planar surfaces of the body 20, or by similar planar capture of the gear itself, or planar capture of a combination of each type face if needed for packageability, between adjacent parallel planar surfaces, as is required by FIG. 1 type configurations. The application of lash adjuster 50 support to the intermediate gear 15 via the body 20 may either be directly, such as is illustrated in FIG. 1, where the curved surface 57 of piston 55 cooperates with curved surface 59 of body 20 allowing the body to pivot about a pivot 56, or in conjunction with a rocker structure 87 that pushes the body 20 in the appropriate direction: see FIG. 2 as a schematic illustration of such a so-called two-bar linkage.

Figure 3:
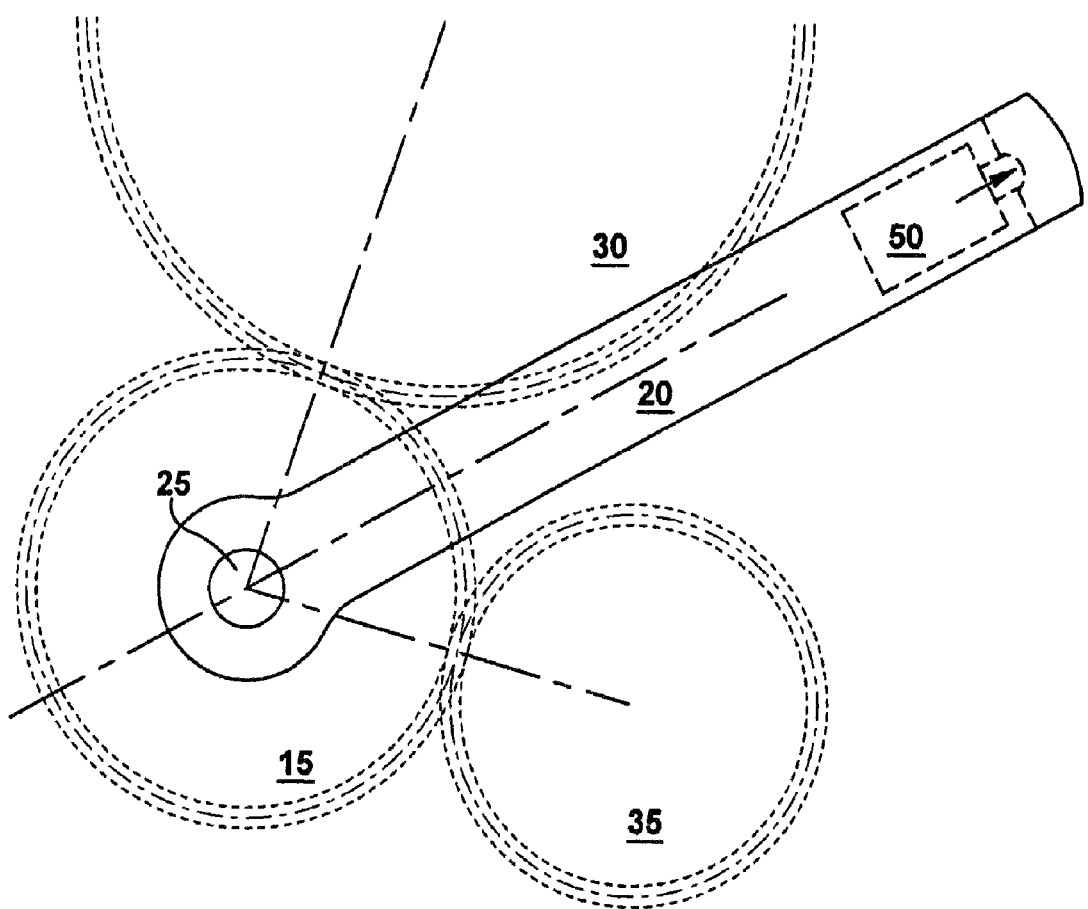
FIG. 3 is third embodiment of an apparatus for controlling backlash.
Figure 4:
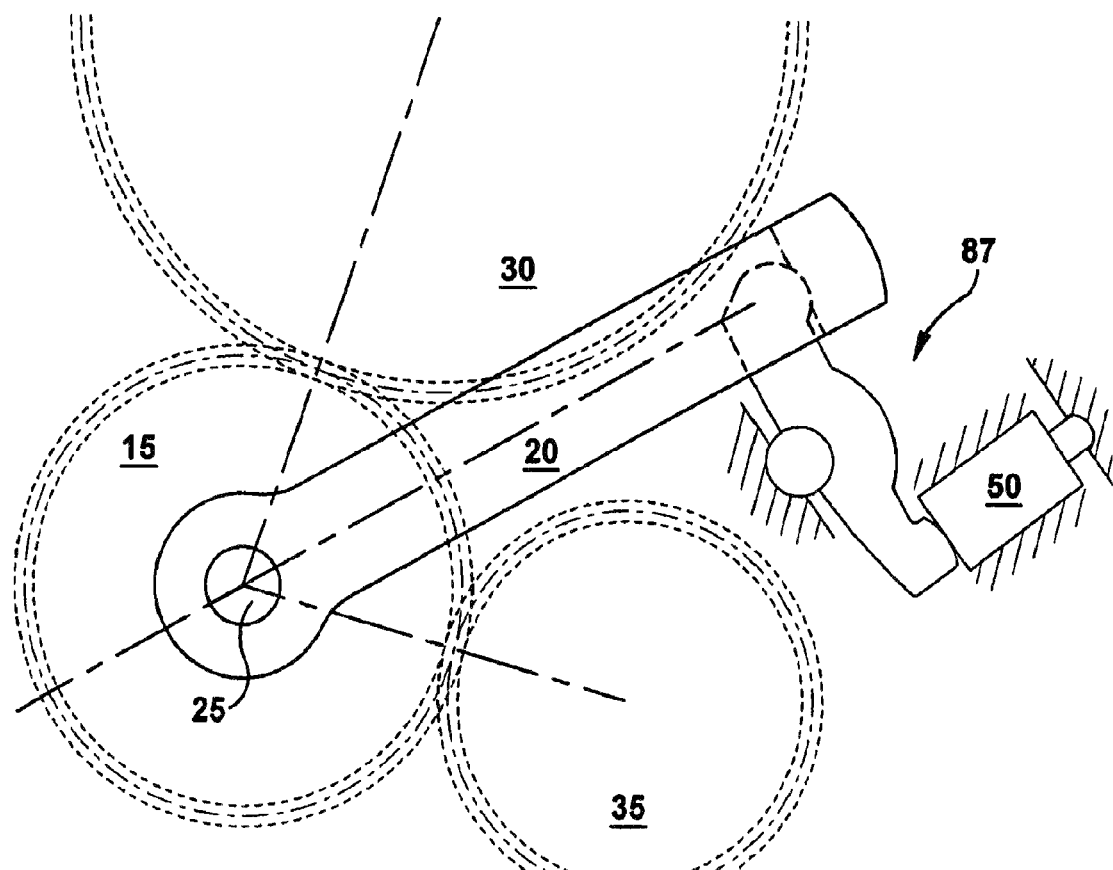
FIG. 4 is a fourth embodiment of an apparatus for controlling backlash.

Alternatively and as shown in FIG. 3, a tensile type of body 20 may be pulled in the appropriate direction by a lash adjuster 50 or a rocker apparatus 87 transferring force from a lash adjuster 50 as shown in FIG. 4. In any case, the two-degrees-of-freedom of the intermediate gear's rotational centerline, required in order for the intermediate gear to be able to freely seek backlash minimization at both of its meshes, characterize this floating center intermediate gear classification of motion control apparatus. Structural arrangements which provide for the requisite two-degrees-of-freedom mobility principally fall into the general category of two-bar linkages, wherein the functionality of a "mobility link", to provide mobility in a direction differing from that of principal loadings, comes by means of an actual link member, an eccentric, or a sliding contact fulcrum.

The ability to purge air from the internal, oil capturing, volume of a lash adjuster 50 is a valuable functionality because of the tendency for the moving parts of an engine to entrain micro-bubbles of air in the oil, a phenomenon commonly known as aeration. The inclusion of air bubbles in the captured oil acts to introduce compliance, or sponginess, to an apparatus designed to be rigid against rapid dimensional changes. Near-vertical orientation of a lash adjuster 50 facilitates the escape of air from a lash adjuster 50 which includes a bleed orifice at the highest point of the capture space 60.

Figure 5:
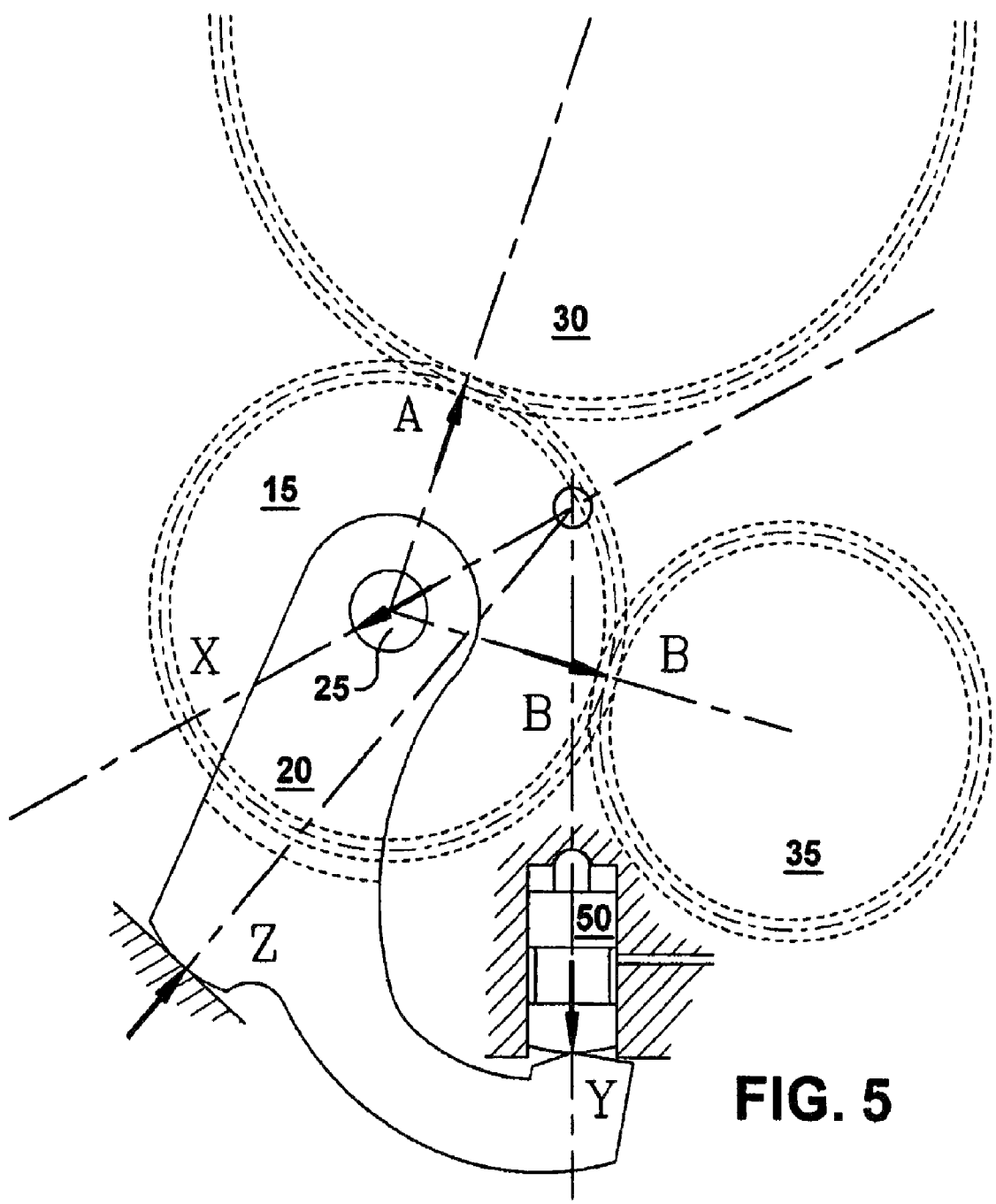
FIG. 5 is a fifth embodiment of an apparatus for controlling backlash.

The change in nominal direction of operating forces from nearly vertical, at a near-vertical lash adjuster 50, to the more-horizontal ideal nominal orientation of a floating center intermediate gear's biasing load direction, is readily achieved in the case of a mobility link between lash adjuster and input gear by aligning the mobility link's nominal support direction Z with the resultant of the two principal loading vectors, namely that of force X, which opposes the vector resultant of nominal meshing force vectors A and B, and force Y, as applied by the lash adjuster 50 to body 20. FIG. 5 shows an example of this rocker body type arrangement schematically.

Figure 6:
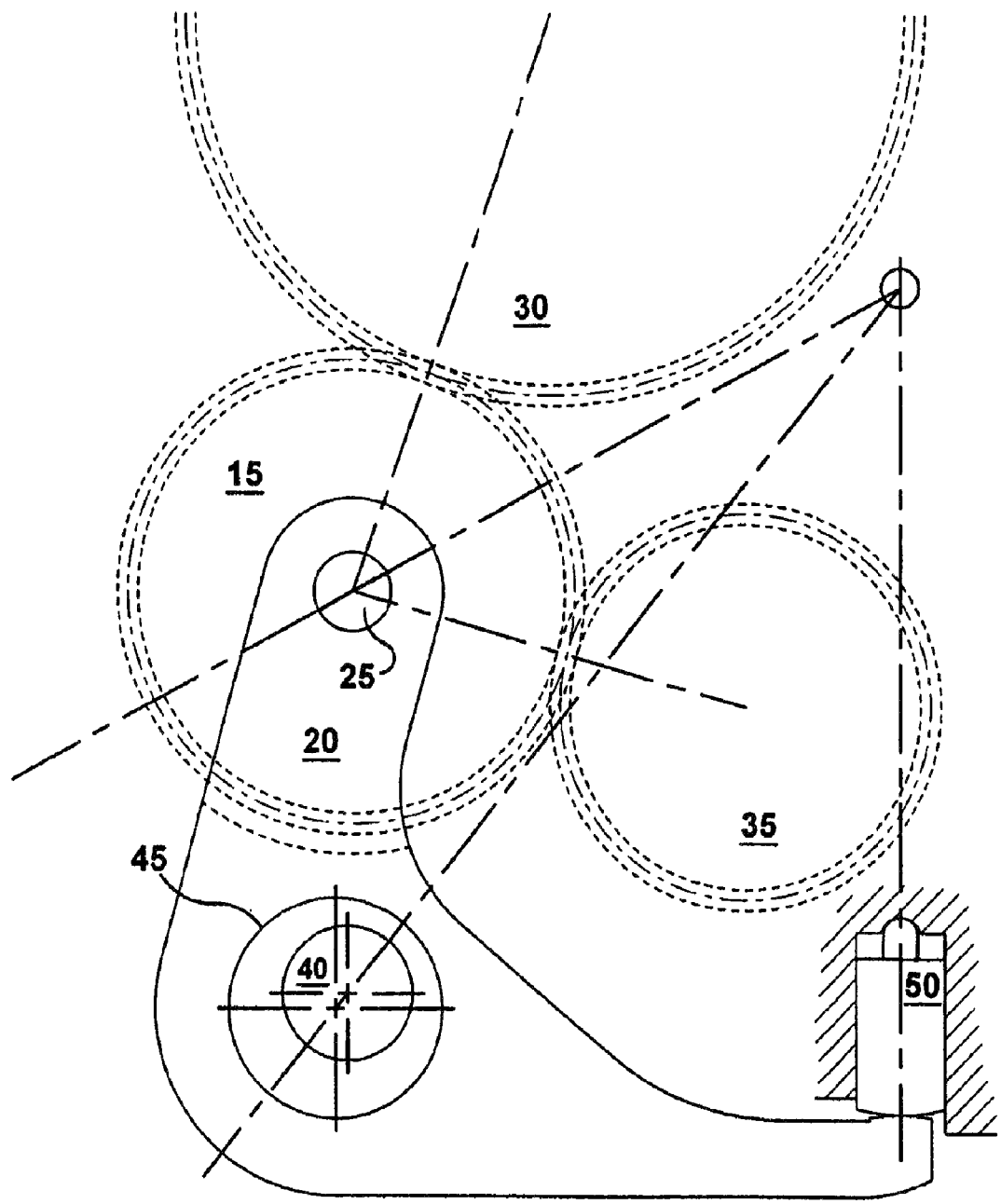
FIG. 6 is a sixth embodiment of an apparatus for controlling backlash.
Figure 7:
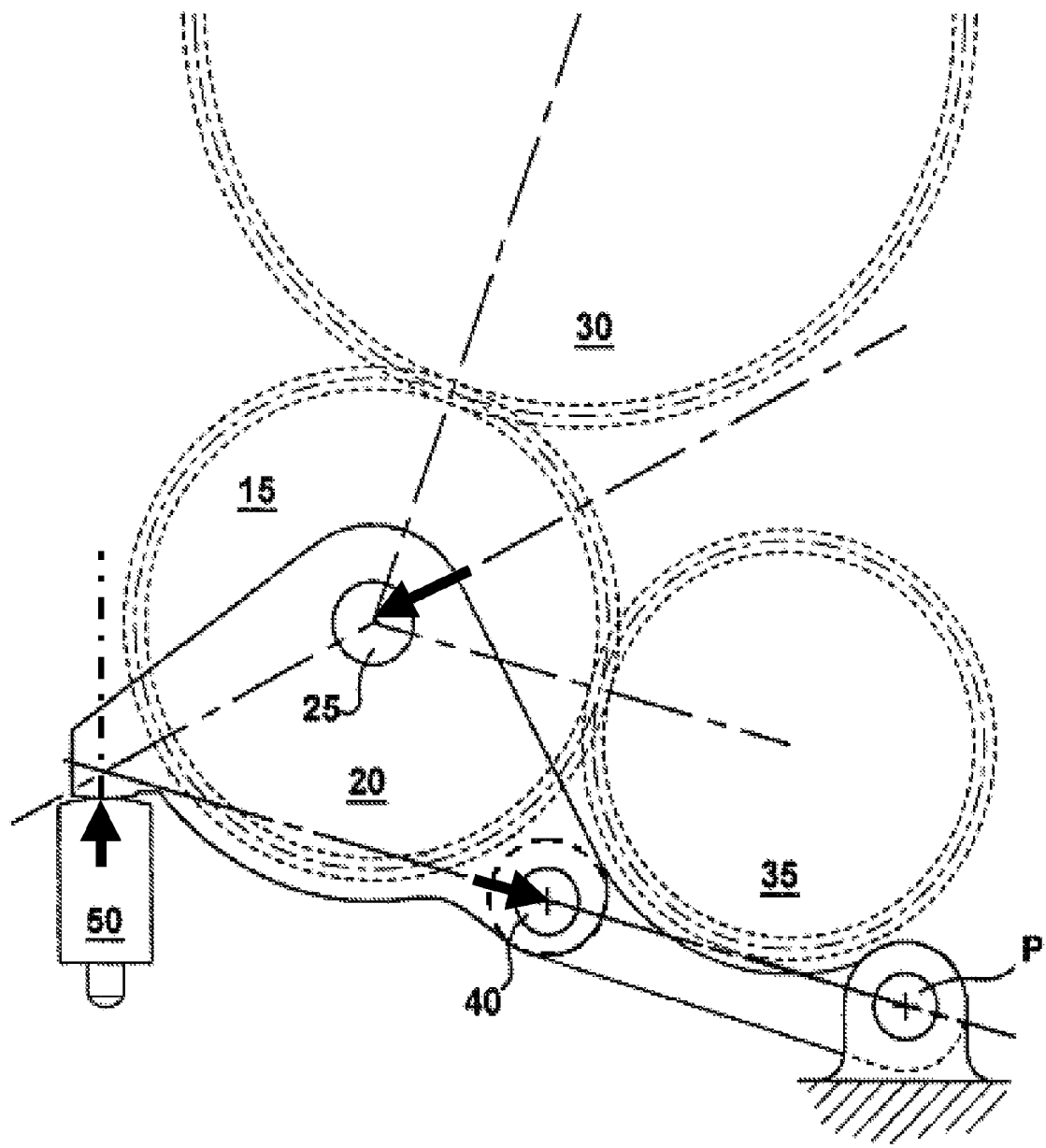
FIG. 7 is a seventh embodiment of an apparatus for controlling backlash.

Axis alignment control on a floating center intermediate gear may alternatively be assured by constructing the two-bar apparatus with parallel-axis pivot bearings having sufficient anti-tilt stability, in conjunction with the tilt resistance of the intermediate gear axle(s) and the deflection stiffnesses of the link axle anchoring structure and the links themselves. FIG. 6 shows an example of this type of floating center intermediate gear apparatus utilizing an eccentric sleeve as mobility link. FIG. 7 shows a motion control apparatus using axis alignment control with remote dual pivot axes. As more fully described above, FIG. 8 shows a motion control apparatus utilizing an axis alignment control with dual pivot axes.

Category 2

Dual Axis Independent Lash Adjusters

Figure 9:
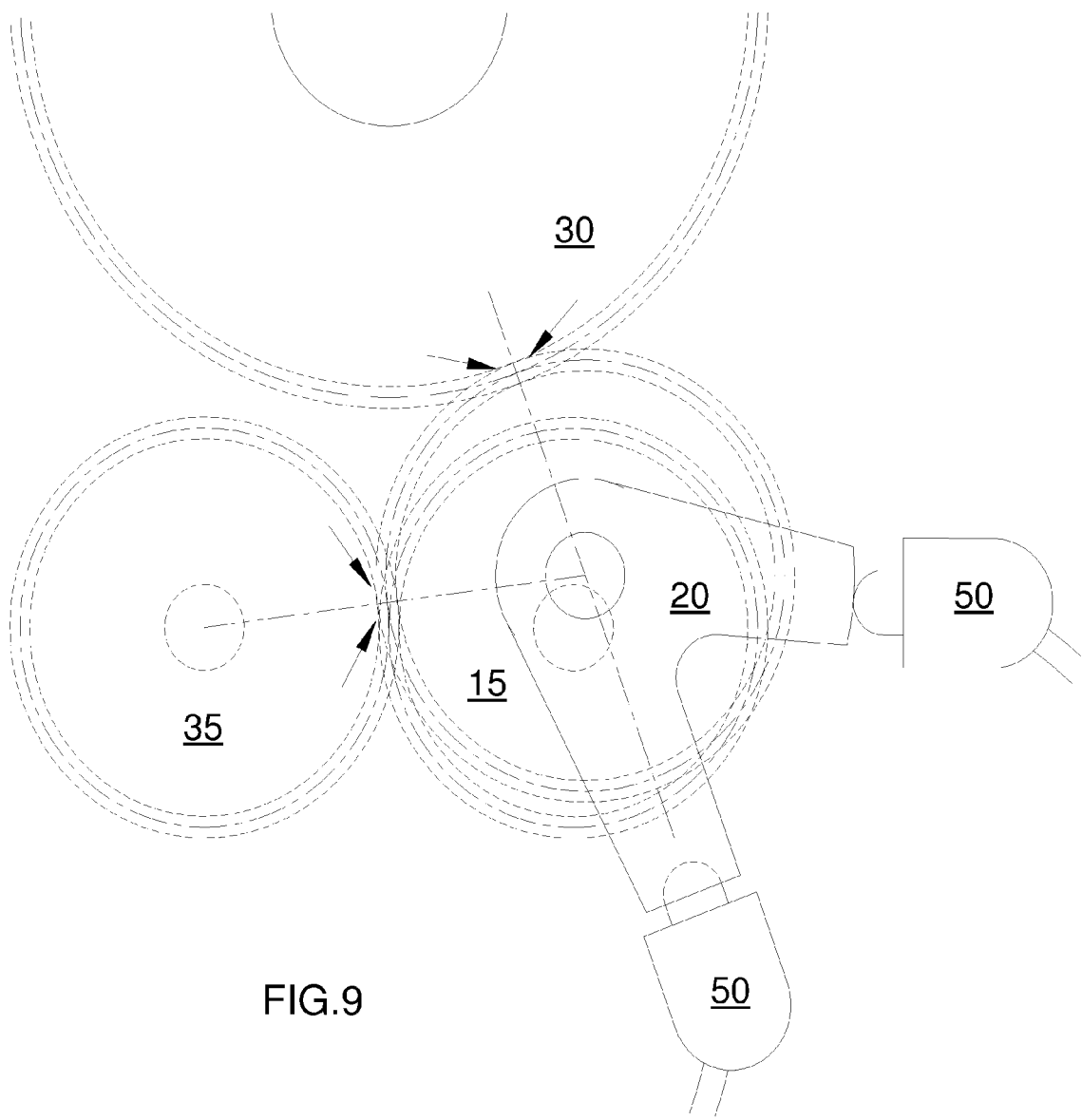
FIG. 9 is a ninth embodiment of an apparatus for controlling backlash.

The addition of a second lash adjuster 50 enables differing mesh loadings between the crankshaft gear 30 and the mating gear 35 and stabilizes the body 20 spatially to a greater extent than the apparatus of FIGS. 1-8. FIG. 9 illustrates the simplest construction of this 2nd two-degrees-of-freedom motion control category, with lash adjusters 50 bearing directly on the body 20. Alternative structures utilizing rockers or the like to enable more vertical lash adjuster orientation do not depart from the scope of the category so long as they provide similar independent support in each, substantially, of the two mesh directions.

The aforementioned, in Category 1, ideal nominal orientation of a floating center intermediate gear's biasing load direction, or principal loading direction, of a single lash adjuster apparatus may be varied, to simulate the differing nominal meshing load capability of the dual lash adjuster arrangement, by design geometry choices. Such deliberate biasing does not, however, replicate the inherent stiffness, against repulsion, of the directly applied, in direction of meshes, Category 2 apparatus.

Category 3

Fixed Center Distance to Balance Shaft Apparatus Gear

Figure 10:
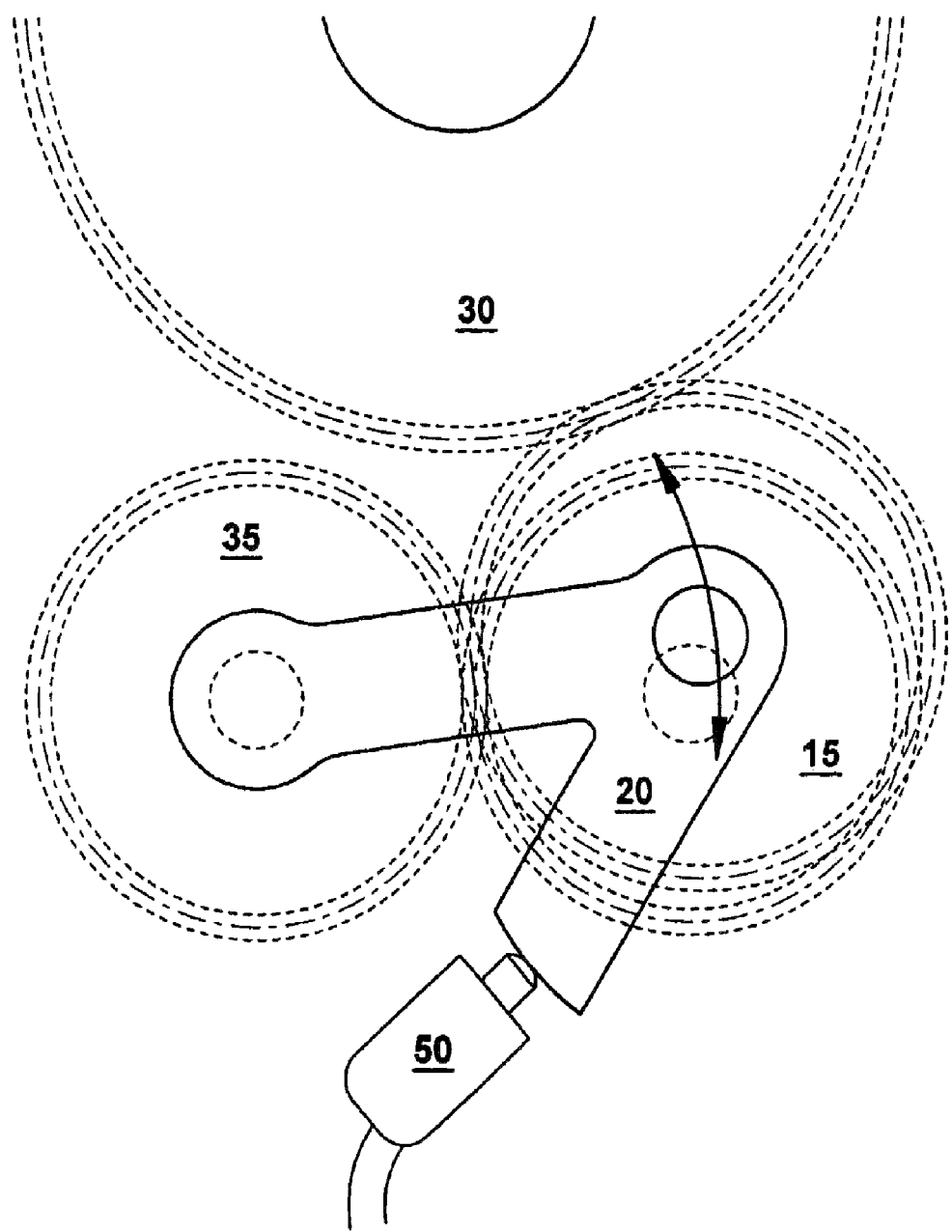
FIG. 10 is a tenth embodiment of an apparatus for controlling backlash.

In FIG. 10, the first of several single-degree-of-freedom categories, a housing member extension of the body 20, or alternatively a motion control mechanism such as at least one arcuate path slider, constrains the body 20 to rotate about a pivot axis substantially coincident with the centerline of the mating gear 35 while providing the inventive variable center distance with respect to the crankshaft gear 30. This configuration is a special case of the more general Category 5 classification of FIG. 12, as discussed below. The Category 3's fixed center distance between the intermediate gear and the mating gear 35 provides, at substantial hardware complexity and cost, the theoretically most constant backlash at constant temperature with the mating gear.

Category 4

Translation in Direction Substantially Normal to Center Distance Direction

Figure 11:
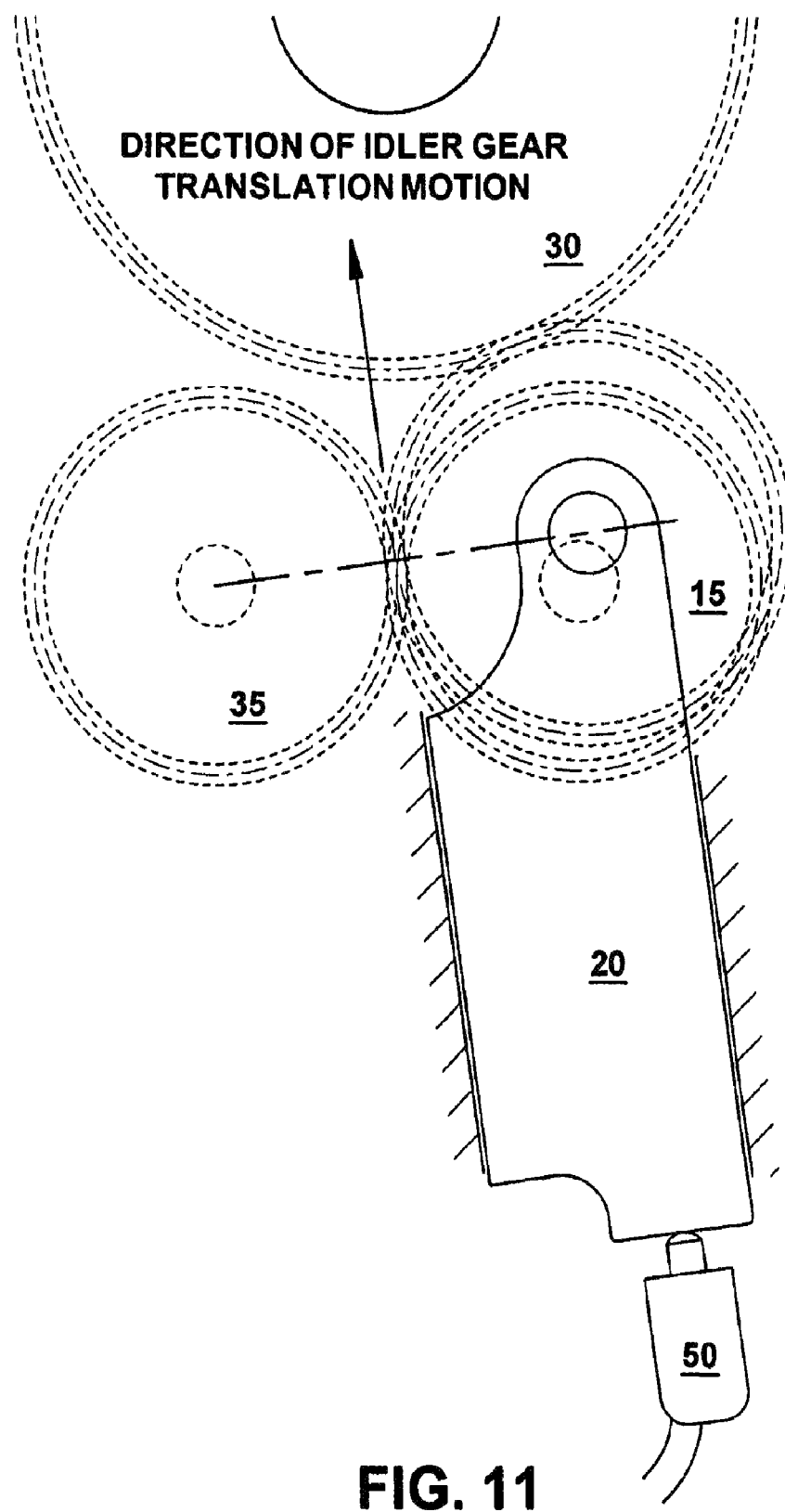
FIG. 11 is an eleventh embodiment of an apparatus for controlling backlash.

This direction of body 20 and intermediate gear 15 travel maintains substantially constant center distance between the intermediate gear 15 and the mating gear 35 for the small range of travel needed to maintain backlash constancy with the crankshaft gear 30, simplifying structural configurations to facilitate manufacturability. FIG. 11 is a schematic illustration of this category of single-degree-of-freedom motion control.

Category 5

Figure 12:
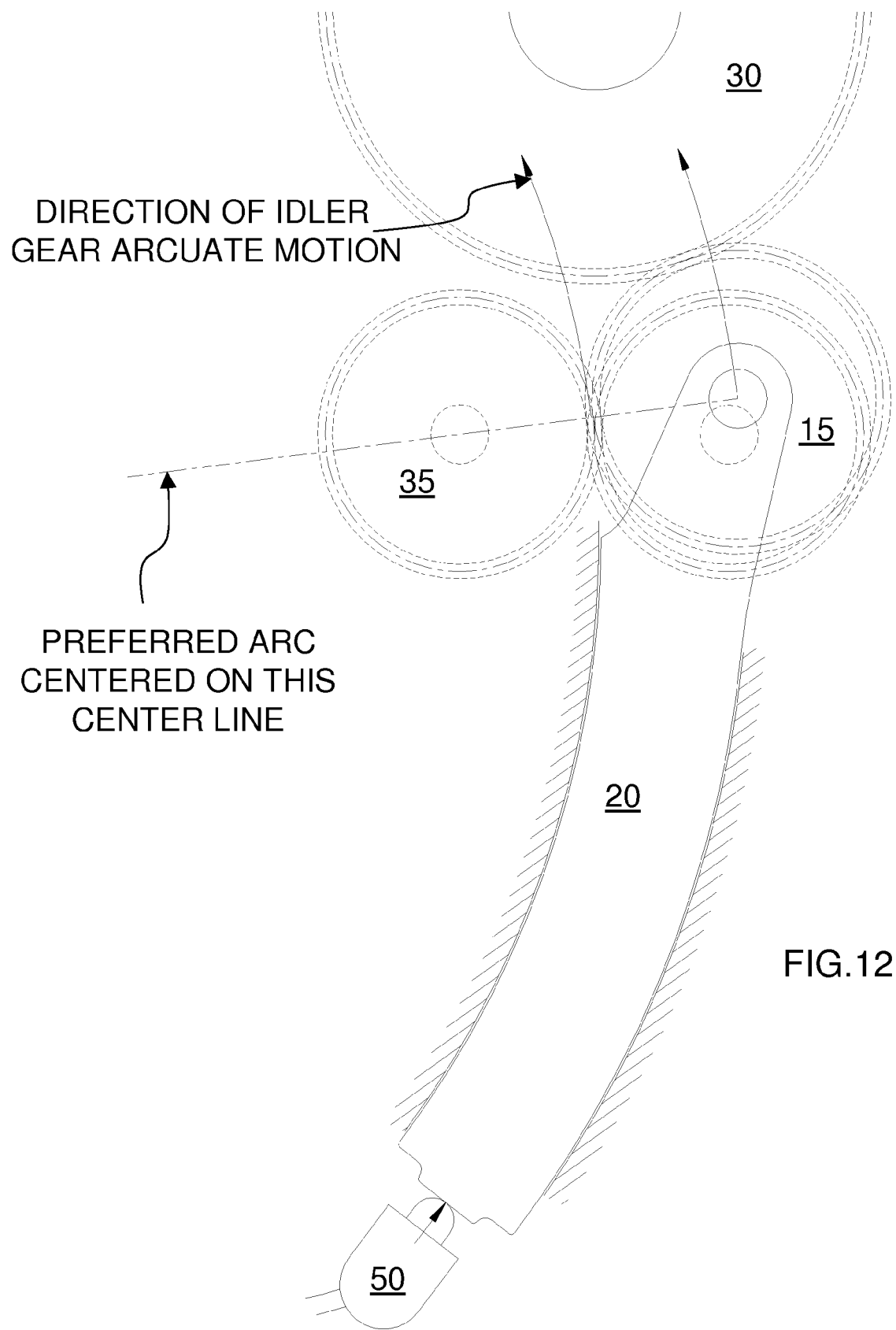
FIG. 12 is a twelfth embodiment of an apparatus for controlling backlash.

Arcuate Travel About Center Substantially Coinident with Center Distance Direction, Displaced in Direction from Intermediate Gear to Mating Gear This direction of body 20 travel, as illustrated schematically in FIG. 12, maintains somewhat more constant center distance between the intermediate gear 15 and the mating gear 35 than does the apparatus of FIG. 11, but less than that of the special case apparatus of FIG. 10, while potentially simplifying structural configurations further to facilitate manufacturability.

Category 6

Figure 13:
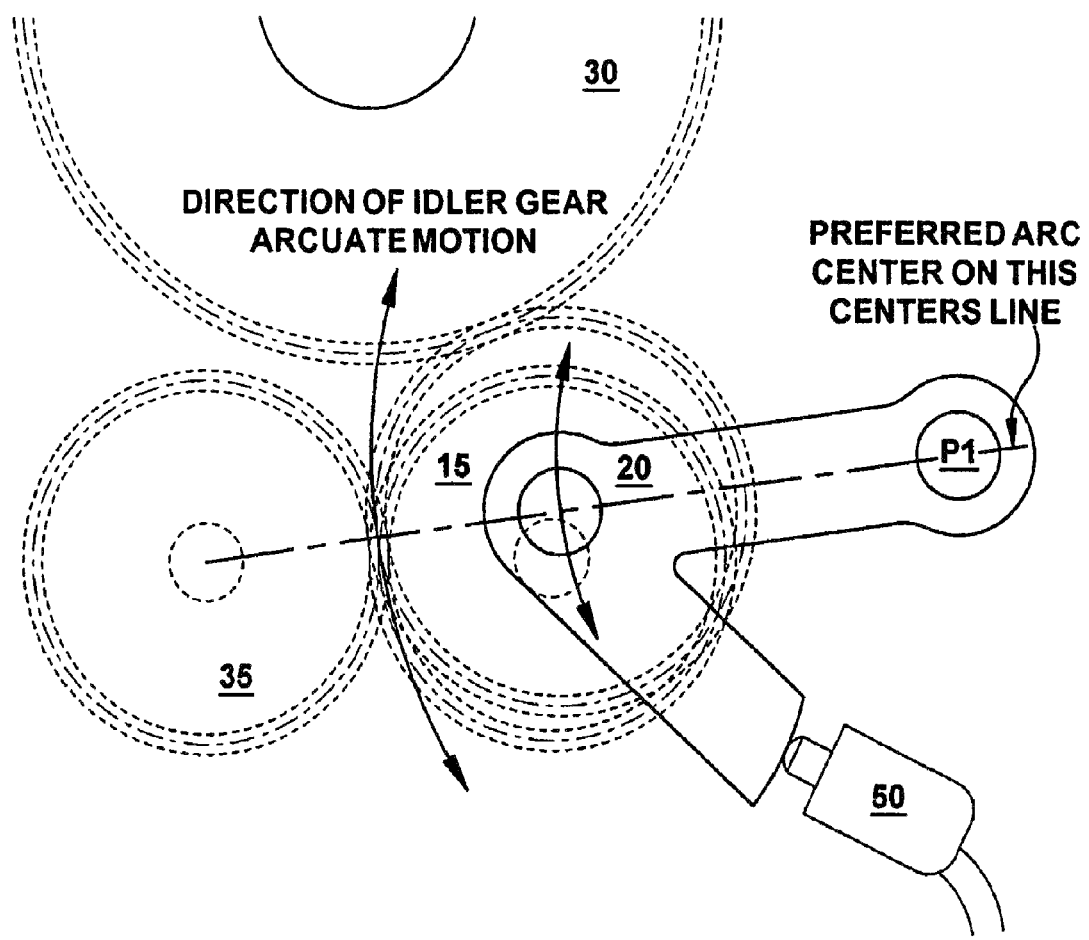
FIG. 13 is a thirteenth embodiment of an apparatus for controlling backlash.

Arcuate Travel About Center Substantially Coincident with Center Distance Direction, Displaced in Direction from Mating Gear to Intermediate Gear This direction of body 20 travel maintains less constant center distance between the intermediate gear 15 and the mating gear 35 than do the apparatus of FIG. 11 and FIG. 12, while potentially further simplifying structural configurations to facilitate manufacturability and packageability. FIG. 13 illustrates a single-degree of motion of arcuate motion of body 20 pivotable about pivot axis P1 and actuated by lash adjuster 50.

While illustrations and text herein describe parallel axis gearsets, the inventive concept applies to other types of gearsets as needed.

While the present invention is described with reference to several embodiments of the invention, nothing in the specification should be interpreted to limit this invention to any particular embodiment or any common characteristic except as explicitly recited in the appended claims.

Having thus described the invention, we claim:

1. A gear system comprising:
    a first gear, said first gear having a first substantially fixed axis of rotation;
    a second gear adjacent said first gear, said second gear having a second substantially fixed axis of rotation;
    a third gear having a third axis of rotation and positioned adjacent to said first gear and said second gear, said third gear being movable with two degrees of freedom, wherein said third gear is arranged to movably engage said first gear and said second gear, said third gear defining a first center distance between said first axis of rotation and said third axis of rotation; and,
    a first body coupled to said third gear, said first body movable to vary said first center distance; and,
    a second body operably coupled to said first body by a pivot, said second body being linearly movable, wherein said third gear moves with said two degrees of freedom in response to linear movement of said second body.

2. The gear system of claim 1 wherein said third gear further defines a second center distance between said second axis of rotation and said third axis of rotation, wherein said first body is movable to vary said second center distance.

3. The gear system of claim 2 wherein said second center distance decreases as said body moves in said first direction.

4. The gear system of claim 2 wherein said third axis of rotation moves along an arcuate path as said first body moves in said first direction.

5. The gear system of claim 1 further comprising:
    a first motion control device operably coupled to said first body through said second body, said first motion control device applying a first force to said first body, wherein said first force biases said first body in a first direction.

6. The gear system of claim 5 wherein said first motion control device includes at least one biasing member that applies said first force to said first body.

7. The gear system of claim 6 wherein said first motion control device further applies a first hysteretic damping force to said first body when said first body moves in a second direction.

8. The gear system of claim 7 wherein:
said first motion control device contains a fluid having fluid viscosity and includes a restriction path for the flow of said fluid into said first motion control device at a first pressure; and,
said first hysteretic damping force is a function of both said fluid viscosity and a flow of said fluid out of said motion control device at a second pressure, wherein said second pressure is substantially greater than said first pressure.

9. The gear system of claim 8 wherein said first motion control device further includes:
a capturing space adjacent one end of said restriction path; and,
wherein said second body is at least partially disposed in said capturing space and is movable in response to said first force from said biasing member and a reaction force transmitted to said third gear by at least one of said first gear and said second gear.

10. The gear system of claim 9 wherein said restriction path comprises:
a metering orifice within said restriction path, and,
a first valve arranged between said orifice and said capturing space;
wherein said metering orifice and said first valve are arranged to allow said fluid to flow into said capturing space at said first pressure, and to resist fluid flow from said capturing space.

11. The gear system of claim 10 wherein said flow of said fluid from said capturing space is substantially zero.

12. The gear system of claim 10 wherein said restriction path further comprises a second valve arranged between said metering orifice and said first valve, wherein said second valve allows flow of said fluid from said first motion control device when a third pressure of said fluid in said restriction path is above a thresholds wherein said second valve is fluidly coupled to said capturing space through said first valve.

13. The gear system of claim 12 wherein said second valve is a bypass valve.

14. The gear system of claim 9 wherein said at least one biasing member applies said first force to said movable member in said first direction.

15. The gear system of claim 14 wherein said biasing member is a spring.

16. The gear system of claim 14 wherein said first direction is substantially towards said third axis of rotation.

17. The gear system of claim 1 further comprising:
a crankshaft coupled to said first gear; and,
a balancing shaft coupled to said second gear.

18. An engine having a crankshaft, a balancing shaft and a pump system operably coupled to said crankshaft and said balancing shaft, said engine comprising:
a first gear coupled to said crank shaft, said first gear and said crank shaft having a first axis of rotation;
a second gear coupled to said balancing shaft, said second gear and said balancing shaft having a second axis of rotation;
a third gear engagably coupled to said first gear and said second gear and movable with two degrees of freedom, said third gear having a third axis of rotation defining a first center distance between said first axis of rotation and said third axis of rotation;
a first body coupled to said third gear, said body movable to vary said first center distance; and,
a first motion control device having a second body pivotally coupled to said first body and arranged to move said first body in a first direction, wherein said third gear moves with two degrees of freedom in response to said movement of said first body in said first direction, said first motion control device being fluidly coupled to said pump system.

19. The engine of claim 18 wherein said third gear further defines a second center distance between said second axis of rotation and said third axis of rotation, wherein said first body is movable to vary said second center distance.

20. The engine of claim 18 wherein said first motion control device includes at least one biasing member that applies a first force to said first body.

21. The engine of claim 20 wherein said first motion control device further applies a first hysteretic damping force to said first body when said first body moves in a second direction.

22. The engine of claim 21 wherein:
said first motion control device contains a fluid having fluid viscosity and includes a restriction path for the flow of said fluid into said first motion control device at a first pressure; and,
said first hysteretic damping force is a function of said fluid viscosity and a flow of said fluid out of said motion control device at a second pressure, wherein said second pressure is substantially greater than said first pressure.

23. The engine of claim 22 wherein said first motion control device further includes:
a capturing space adjacent one end of said restriction path; and,
wherein said second body is movable in response to a first force from said biasing member and a reaction force transmitted to said third gear by at least one of said first gear and said second gear.

24. The engine of claim 23 wherein said movable member is arranged within said capturing space.

25. The engine of claim 24 wherein said restriction path comprises:
a metering orifice within said restriction path, and,
a first valve arranged between said orifice and said capturing space;
wherein said metering orifice and said first valve are arranged to allow said fluid to flow into said capturing space at said first pressure, and to allow fluid flow from said capturing space at said second pressure.

26. The engine of claim 25 wherein said flow of said fluid from said capturing space is substantially zero.

27. The engine of claim 25 wherein said restriction path further comprises a second valve arranged between said metering orifice and said first valve, wherein said capturing space is fluidly coupled to said second valve only through said first valve, wherein said second valve allows flow of said fluid from said first motion control device when a third pressure of said fluid in said restriction path is above a threshold.

* * * * *